United States Patent [19]

Habig et al.

[11] Patent Number: 5,239,247

[45] Date of Patent: Aug. 24, 1993

[54] RECONFIGURABLE MASTER-SLAVE CONTROL

[75] Inventors: Thomas F. Habig, Batavia; Ronald M. Sparer, Madeira, both of Ohio

[73] Assignee: Cincinnati Milacron, Cincinnati, Ohio

[21] Appl. No.: 900,811

[22] Filed: Jun. 17, 1992

[51] Int. Cl.$^5$ .......................... G05B 19/24; H02P 5/46
[52] U.S. Cl. .............................. 318/568.18; 318/571; 318/77; 318/34; 318/67
[58] Field of Search ..................... 318/34–90, 318/560–636; 395/80–86; 901/3, 7, 9, 12, 15, 17, 19–23

[56] References Cited

U.S. PATENT DOCUMENTS

| | | | |
|---|---|---|---|
| 3,150,213 | 9/1964 | Doering | 264/40 |
| 3,838,321 | 9/1974 | Damm et al. | 318/77 |
| 4,061,947 | 12/1977 | Vogel | 318/77 |
| 4,093,904 | 6/1978 | Burig et al. | 318/616 |
| 4,174,237 | 11/1979 | Hemming, Jr. et al. | 318/59 X |
| 4,334,175 | 6/1982 | Tanaka et al. | 318/66 |
| 4,437,046 | 3/1984 | Faillace | 318/571 |
| 4,460,852 | 7/1984 | Kondo et al. | 318/67 |
| 4,506,197 | 3/1985 | Kondo et al. | 318/34 |
| 4,518,899 | 5/1985 | Wolf | 318/51 |
| 4,562,388 | 12/1985 | Wolf | 318/67 |
| 4,617,497 | 10/1986 | Wolf | 318/77 |
| 4,765,456 | 8/1988 | Bower | 318/85 |
| 4,789,814 | 12/1988 | Akashi et al. | 318/77 |
| 4,858,139 | 8/1989 | Wirtz | 364/473 |

*Primary Examiner*—Paul Ip
*Attorney, Agent, or Firm*—Wood, Herron & Evans

[57] ABSTRACT

A machine control permits the selection of input values defining configurations of motors on the machine in desired master-slave relationships. Individual master-slave dependencies may be selectively activated and deactivated. In response to a new commanded velocity for a master motor the control is effective to alter the velocities of all motors dependent therefrom as a function of change of velocity of the master motor and selectable slave ratios.

12 Claims, 9 Drawing Sheets

RECONFIGURABLE MASTER-SLAVE CONTROL

BACKGROUND OF THE INVENTION

Field of the Invention

The invention relates generally to a control for slaving the velocity changes of slave motors to associated master motors. In particular, the invention provides a control for an extruding apparatus in which a plurality of motors may be easily configured into any desired combination of master-slave relationships.

Description of the Related Art

It is known on current extruding machines to slave the operation of a motor on a puller or material feeder to the operation of the motor rotating the extruder screw. In those systems, a slaving ratio controls the magnitude of change of velocity of the slave motor in response to changes of velocity of the master motor. With ratio control, changes in velocity of the puller motor or the feeder motor may be related to changes in velocity of the extruder motor in proportion to the slaving ratio which is determined from empirical experience with a particular material, a set of dies and a machine. Further, as described in U.S. Pat. No. 4,437,046 issued to L. Faillace on Mar. 13, 1984, control modules may selectively provide variable ratio settings and speed settings, and a master reference value may be used to permit controlled variable ratio control operation of an extrusion system.

With extruder applications of increasing complexity, there is a need to be able to reconfigure the master-slave relationships of various motors associated with an extruding apparatus. For example, a co-extrusion machine may have two extruders feeding into a common extrusion block. Therefore, two extruder motors, two material feed motors and a puller motor must be controlled. In one application, it may be desirable to have one extruder motor control changes of velocity of several slave motors, such as a first material feed motor, a puller motor, and a second extruder motor. It may be further desirable to have a second material feed motor slaved to changes of velocity of the second extruder motor. In a second application, it may be desirable for the extruder motors to operate independently, with their respective material feed motors slaved thereto. Another application may require that each of the extruder motors be slaved to the operation of the puller motor. Finally, in an application using a constant volume feed mechanism, it may be desirable to have the extruder motor slaved to the feeder motor.

It is clear from the above that the known control designs, which fix either a puller motor or a material feeder motor as a slave to a master extruder motor are not capable of meeting the demands of more complex extruder apparatus configurations and applications. The known controls do not have the capability of easily reconfiguring the motors into multiple master-slave relationships. The known controls cannot easily define any motor as a master motor, define a plurality of master motors, or define a hierarchy of master-slave relationships.

SUMMARY OF THE INVENTION

The present invention provides a method and apparatus for operating motors in selectable combinations of master-slave relationships. The user has the capability of readily providing input values representing a desired configuration of master-slave relationships. The input values identify slave motors having a velocity dependencies to master motors within the desired configuration of master-slave relationships. Ratio values for each of the slave motors are produced. Changes in velocity of a master motor are detected and are used with the input values and the ratio values to produce slave velocity signals for the slave motors. The slave velocity signals produce changes of velocity of the slave motors as a function of the changes in velocity of the master motor and the ratio values. The invention allows the user to selectively define ratio values either manually or from actual operating conditions and to selectively activate ratio control of any or all of the slave motors.

The control system has the advantage of easily configuring a group of motors into any combination of master-slave relationships. Each master-slave relationship is selectively independent of, or dependent on, other master-slave relationships.

Compared with known extruder machines, the invention permits an extruding system to be more quickly strung together, more quickly brought up to a desired production rate and more reliably adjusted in response to changes in process variables. Further, with the invention, a plurality of extruders may be more easily controlled when operating either independently or in parallel through a single co-extrusion head, or serially on a production line.

DETAILED DESCRIPTION

Figure 1:
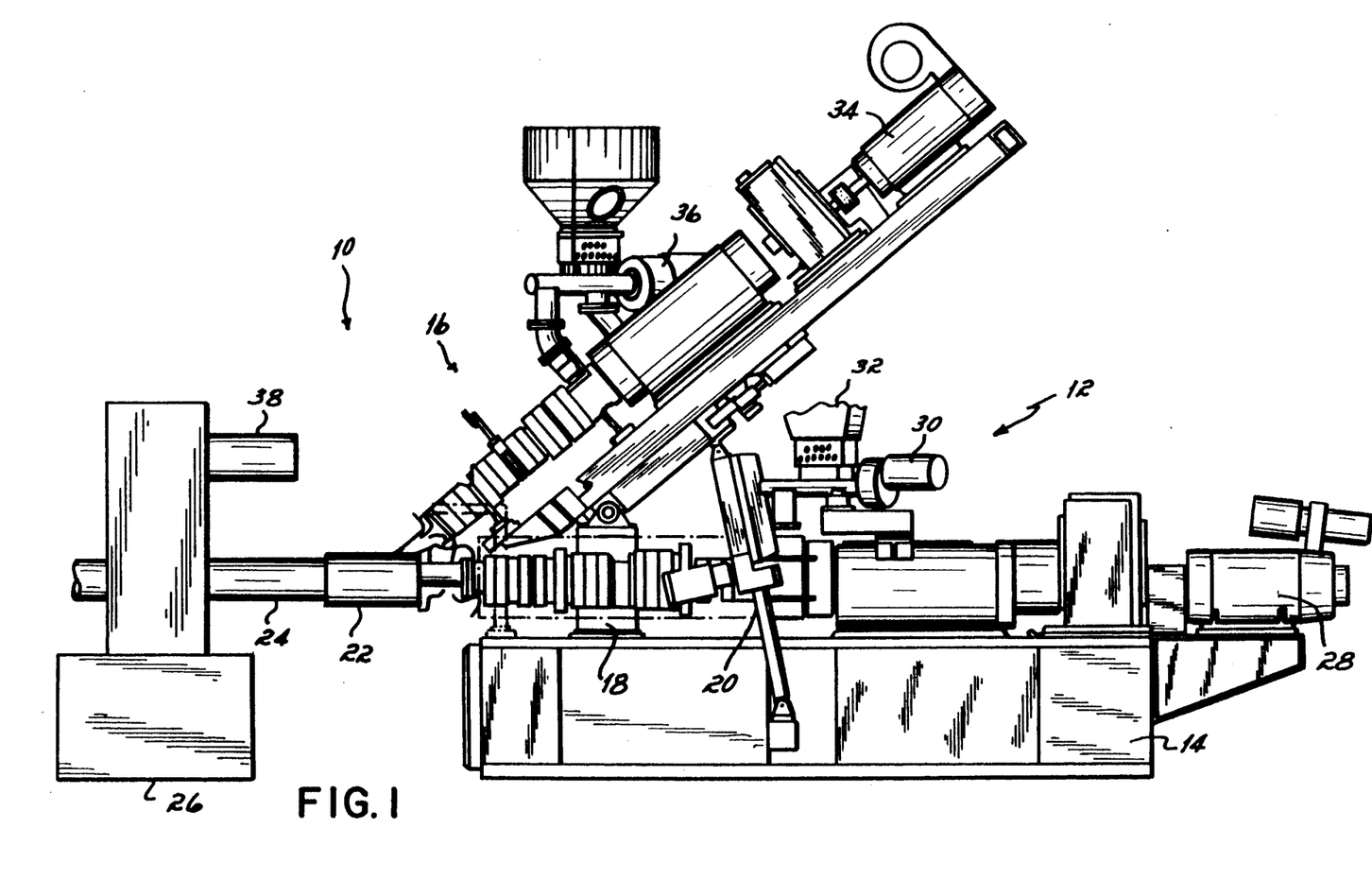
FIG. 1 is a schematic view of an extruding system in which two extruders are operating in a co-extrusion process.

The invention will be illustrated with regard to the extruding machine system 10 illustrated in FIG. 1. A first extruder 12 is mounted on a base 14. A second extruder 16 is pivotally mounted to a pedestal 18 and is also supported by a jack 20. The extruders 12 and 16, have output nozzles connected to an extrusion block 22, which permits the simultaneous extrusion of two materials into a single extruded product 24. Typically, the extruded product is processed by several pieces of downstream equipment, such as a chiller, puller, cutout unit. A puller unit 26 is schematically illustrated and supports and assists in the feeding and handling of the extruded product 24.

The extruder 12 has an extruder motor 28 mechanically connected to an extruding screw. A feeder motor 30 is operative to feed material from a hopper 32 into the working area of the extruding screw. Similarly, the extruder 16 has an extruder motor 34, and a feeder motor 36. The puller has a motor 38, which is operative to move the extruded product 96 from the output of the machine 10.

Depending on the application for which the machine is being used, and the preference of the user, the various motors just described will either operate independently or dependently on each other. For example, if it is desired to increase the rate of production of the extruder 12, the operating speed of motor 28 will be increased. Consequently, more material will be required to be input into the machine and the operating speed of the motor 30 will also have to increase. Since the extruded product 24 will be exiting the machine at a higher linear velocity, the operating speed of the puller motor 38 will also have to be increased. If only a single material is being extruded, the motors 34 and 36 would not be operating. It is known to slave the velocity of feeder motor 30 to the velocity of extruder motor 28. That is typically accomplished by establishing a velocity slaving ratio between the two motors. Therefore, as the speed of motor 28 is increased, the speed of feeder motor 30 will automatically increase as a function of the change in magnitude of the speed of motor 28 times the slaving ratio. As will subsequently be described, the claimed invention permits the various motors on the machine 10 or any machine to be arranged in any configuration of master-slave relationships.

A block diagram of a control for the machine 10 shall be described with reference to FIG. 2. The control is a model Vsx commercially available from Cincinnati Milacron. Control 98 includes a processor module 110 to which are connected interface modules such as, for example, DC output interface module 102, DC input interface module 106, and signal processing module 104. Processor module 110 executes machine control application programs 160 which define machine operation. In addition, processor module 110 executes user application programs 140 to perform functions associated with selected peripheral devices such as creation of display data for display 94. The velocities of motors 28, 30, 34, 36 and 38 are determined by analog output velocity signals produced by signal processor module 104 in response to digital output velocity signals produced by processor module 110 by execution of machine control application programs 160. The velocity signals have magnitudes representing desired velocities of the their respective motors. The signal processor 104 provides the analog signals to motor drive circuits which control the operation of each of the motors. Operation of devices associated with machine 10 which are controlled by binary control signals, i.e. ON/OFF signals, is effected through output interface modules such as, for example, DC output interface module 102. Monitoring of devices producing binary status signals is achieved through input interface modules such as, for example, DC input interface module 106. Each of the modules 102, 104, and 106 are electrically connected to processor module 110 via connectors comprising mating plug and socket pairs such as pairs 100A, 100B, and 100C making up an expansion bus 100 over which are conducted data, address and bus control signals. Expansion bus 100 conforms to the Industry Standard Architecture bus definition and sufficient connector sockets are provided on processor module 110 to accept up to ten modules in expansion bus 100.

Machine control application programs 160 and user defined application programs 140 are stored in memory 116. These programs are executed by microprocessor 112 under control of operating system programs recorded in read-only-memory (ROM) 142. Applicant has chosen the 80386sx microprocessor available from Intel Corporation for microprocessor 112. Data is transferred between the internal data bus of microprocessor 112 and memory 116 directly over local data bus 118. Memory data addresses are transferred over memory address bus 122 and latched at address latch 120. Memory address bus 122 and data and address lines of the expansion bus are controlled by bus controller 114. All data exchanges between microprocessor 112 and expansion bus 100 are performed through bus controller 114. Applicant has selected the 82C386sx bus controller available from Chips and Technologies, Inc. for bus controller 114. Bus controller 114 produces control signals for controlling the transfer of data over expansion bus 100, provides buffering of data bus signals produced by microprocessor 112, and incorporates: an interrupt controller; a real time clock generator; a direct memory access controller; a programmable interval timer; interface logic for an 80387sx numeric coprocessor; and, interface logic for an 8042 keyboard controller.

Keyswitch signals produced by keyboard 96 are interfaced to processor module 110 by a serial link connected to keyboard controller 128. Applicant has chosen the 8242 programmable keyboard controller available from Intel Corporation as keyboard controller 128. This device receives keyboard data in serial form and makes the keyboard data available at an eight bit data bus tied to the bus controller. As keyboard characters are received, keyboard controller 128 produces a data available interrupt signal indicating keyswitch data is available for transfer. Applicants have provided for periodic verification of communication with keyboard controller 128 and operator station 90 by transmission of a predetermined character to keyboard controller 128 to be "echoed". Upon availability of the echo character for transfer, keyboard controller 128 generates a data available interrupt request. Keyboard controller 128 includes a parallel input bus connected to a jumper block (not shown) used in association with system installation and maintenance to provide input signals affecting execution of programs by microprocessor 112.

Display 94 is a back-lighted liquid crystal display organized as 200 rows and 320 columns of display elements. Display data is output by display controller 134 to the display 94 through data signal buffers 130. Applicant has selected the 82C426 LCD/CRT controller available from Chips and Technologies, Inc. as display controller 134. Display data defining the state of each element of display 94 is generated by execution of user application programs 140. The display data is copied into display memory 132 from the expansion bus data lines under control of display controller 134. Display data is transferred to display 94 four bits at a time over four parallel lines under control of display controller 134.

Data communication to external devices such as a programming unit (not shown) is achieved by communication interface 136 effecting transfer of data by, for example, serial communication. Applicant has chosen the 82C601 peripheral controller available from Chips and Technologies, Inc. as the communication interface 136. Communication interface 136 generates a data request interrupt request when data is to be transmitted to the connected device in response to the connected device being in a condition to receive data and a data available interrupt request in response to the availability of data received from the external device. Data are exchanged between communication interface 136 and bus controller 114 over the data lines of expansion bus 100.

As will be appreciated from the foregoing, data communication between microprocessor 112 and the other components of processor module 110 is effected over a combination of local data and address busses and the address and data busses of expansion bus 100. Microprocessor 112 includes a 24 bit address bus and a 16 bit data bus. The address bus of microprocessor 112 is buffered by address transceivers 124 to generate address signals for expansion bus 100. Bus controller 114 produces 8 bit memory addresses for address bus 122 from addresses received over the unbuffered address bus. A 16 bit data bus of bus controller 114 is buffered by data bus transceivers 126 to produce the data lines of expansion bus 100.

Operating system programs executed by microprocessor 112 include event detector programs 144, data acquisition programs 146, background programs 148, diagnostic programs 152, machine control interpreter programs 154 and user processor programs 158. Event detector programs 144 control continuous monitoring of selected signals and programmed responses to detection of predetermined (trigger) conditions of those signals. Data acquisition programs 146 control periodic sampling of selected input signals for use in performing process monitoring under control of the machine control application programs. Diagnostic programs provide power on diagnostics of control system components, initialization of selected data values and initiation of system program execution. Background programs 148 provide data interfaces for user application programs as well as management of real time clock data produced by bus controller 114.

Figure 3A:
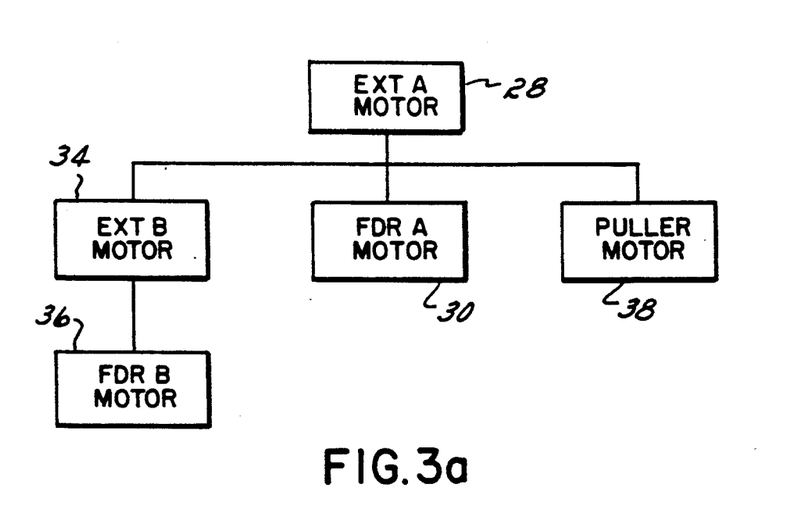
FIGS. 3a through 3c represent schematic master-slave configurations selectable with the present invention on the machine illustrated in FIG. 1.

The application of the invention will be described in detail with regard to the five motors identified in association with the extruder system illustrated in FIG. 1. With the claimed invention, any number of motors may be combined in any number of master-slave configurations. Several exemplary master-slave configurations will be described with reference to FIGS. 3a through 3c and FIG. 1. In a first application, the two extruders may be used in the co-extrusion mode; and it may be desirable to have the extruder 16 slaved to the operation of extruder 12. Consequently, a master-slave configuration will exist as illustrated in FIG. 3a. The extruder motor 28 is defined as a master. The feeder motor 30, extruder motor 34 and puller motor 38 are slaved directly to the extruder motor 28. In addition, the feeder motor 36 is slaved to the extruder motor 34. In that configuration, changes in the commanded velocity of the extruder motor 28 will result in changes of velocity in the feeder motor 36, puller motor 38, extruder motor 34 and feeder motor 36.

Figure 3B:
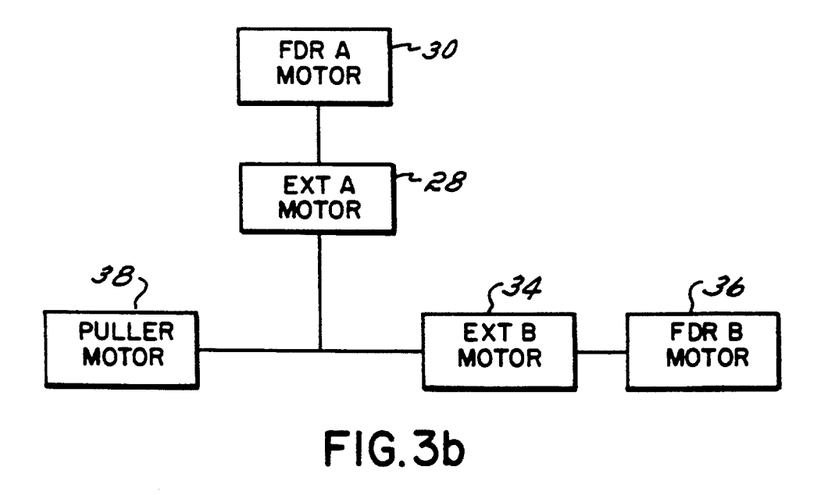

Alternatively, the operator may be running an application in which the feeder motor 30 is driving a constant volume feed mechanism; and as schematically illustrated in FIG. 3b, the operator may decide it is desirable to slave the speed of the extruder motor 28 to the speed of the feeder motor 30. In addition, the operator may desire to slave the extruder motor 34 and puller motor 38 to the extruder motor 28 and to slave the feeder motor 36 to the extruder motor 34. Consequently, in that configuration any change of velocity in feeder motor 30 will result in changes in velocity of the other motors 28, 34, 36 and 38. Further, feeder motor 36 will experience velocity changes in response to velocity changes of either the extruder B motor 34, extruder motor 28 or feeder motor 30.

Figure 3C:
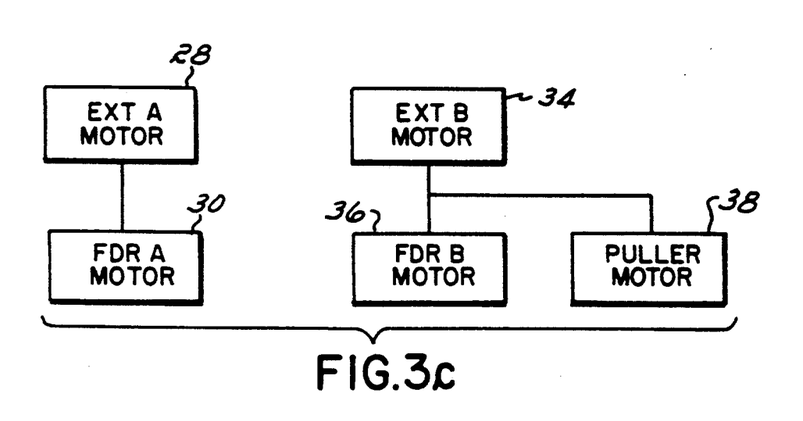

In a different co-extrusion application or in the case of a different operator, it may be decided that independent control over the extruder motors is desired. Therefore, as illustrated in FIG. 3c, the operator may desire to slave feeder motor 30 to extruder motor 28 and separately slave feeder B motor 36 and puller motor 38 to extruder B motor 34. The above examples illustrate a variety of configurations of master-slave relationships that may be desired by the operator and that may be readily established utilizing the claimed invention.

Figure 2:
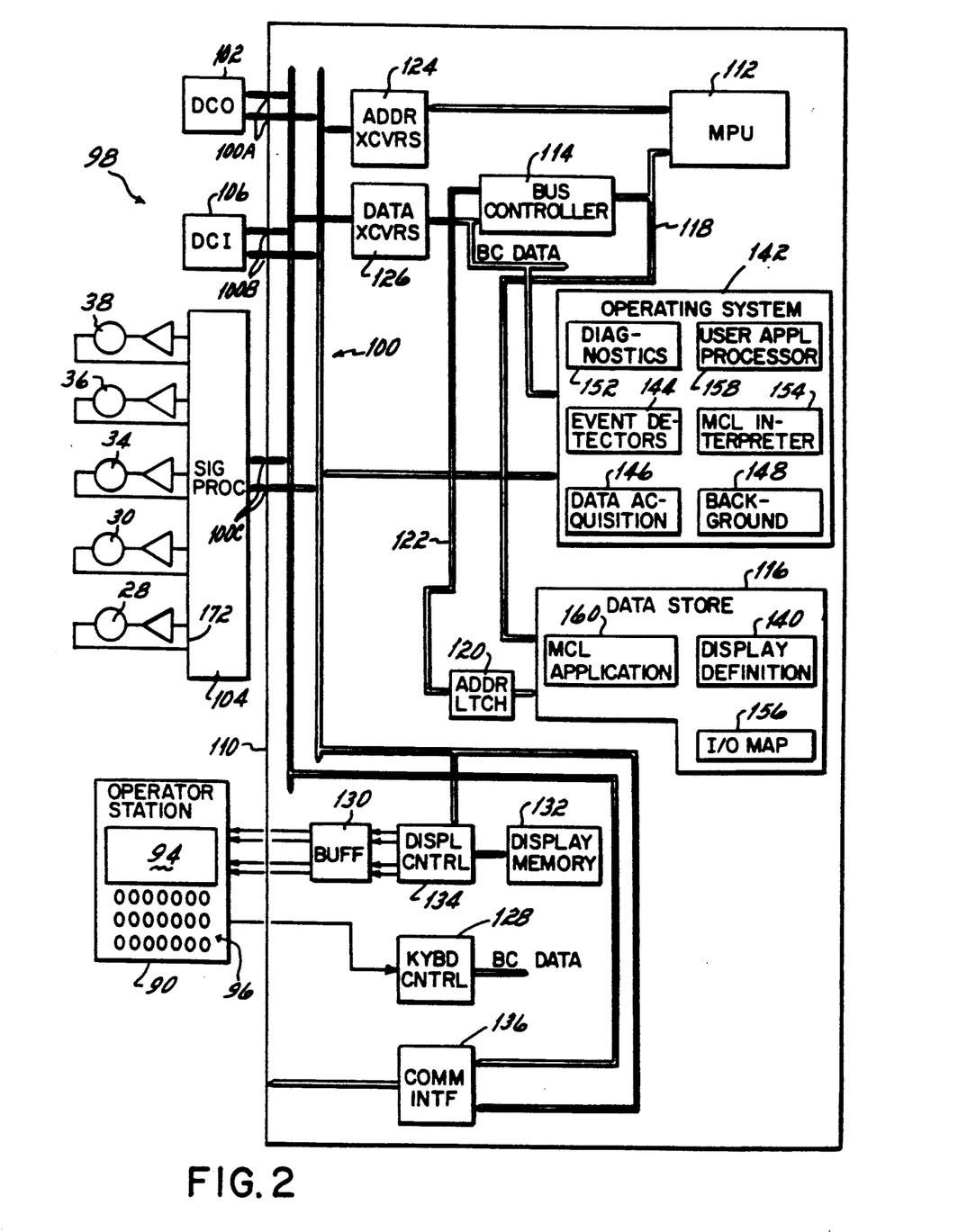
FIG. 2 is a schematic block diagram of the machine control applied to the machine of FIG. 1.

Referring to FIG. 2, utilizing the control illustrated therein and specifically the operator station 90, the operator generates input signals representing input values that define slave motors having velocity dependencies to master motors within a desired configuration of master-slave relationships. There are many possible ways to define the configuration. Pursuant to the present invention, the operator is presented a screen through the display 94, which identifies a numerical status associated with each of the motors available. For example, the following status selections may be available.

Status selection 1=slave to extruder motor A
Status selection 2=slave to feeder motor A
Status selection 3=slave to extruder motor B
Status selection 4=slave to feeder motor B
Status selection 5=slave to puller motor
Status selection 6=master Given those status selections, the operator may then assign a numerical status to each motor. For example, referring to FIG. 3a, extruder A motor 28 would be assigned status 6, feeder A motor 30 would be assigned status 1, extruder B motor 34 would be assigned status 1, feeder B motor 30 would be assigned status 3 and puller motor 38 would be assigned status 1. Given the status signals provided by the operator, the control illustrated in FIG. 2 is then able to utilize the velocity dependencies according to the desired master-slave configuration illustrated in FIG. 3a.

The operator utilizing the operator station 90 has the capability of making additional selections. For example, with regard to each of the motors, the operator can, with a SYNC switch for each slave motor, decide whether to activate or deactivate the configured dependency of that slave motor to its master motor. Therefore, the operator can selectively turn on or turn off any portion or all of the desired configuration of master-slave relationships. In addition, the operator has the capability of providing ratio input signals representing ratio values for each slave motor identified in a desired configuration. A ratio value defines a proportionality constant that is used to scale a change of velocity of a master motor to produce a change of velocity of an identified slave motor. Finally, the operator, using the operator station 90, has the ability to set and change the velocity command signals for the individual motors. Velocity changes may be implemented by selectively using increase and decrease keys on the keyboard 90 to increase or decrease the speed of the motor while the key is activated. Alternatively, using other keys, a velocity command signal may be changed to a desired numerical value. In the preferred embodiment, a display screen, for example, a velocity set screen, may be selected that permits the selection of velocity command signals, SYNC status, ratio values; and the screen also identifies the master or slave status of the motors. In addition, the operator station 90 may on the same screen display actual operating conditions, for example, motor current and angular velocity of the extruder motors, angular velocity of the feeder motors, percent of screw thrust, melt pressures for each extruder and linear velocity of the puller.

As will be appreciated by those who are skilled in the art, there is no standard process for starting an extruding machine and bringing it up to production status. However, one process will be described with reference to FIG. 3a. In this process, independent control of all the motors is initially desired. Therefore, the operator will deactivate all of the slave motor dependencies by setting all SYNC values off. First, extruder motor 28 is started, and thereafter feeder motor 30. The speed of those two motors is independently adjusted until an extruded product 24 is produced. Next the speed of the puller motor is independently adjusted until it is synchronized with the speed of the extruded product 24, from the output of extruder 12. Extruder motor 34 and feeder motor 36 are then started. The velocity of those two motors are independently adjusted to produce a desired co-extruded product 24.

When the extruded product is being produced, handled and removed from the machine at an initial lower production rate, the operator then begins to increase motor speeds thereby increasing production until the desired production rate is achieved. In this process, the operator may use the displays available through operator station 90 which present the real time values of motor current and speed. In moving from a low production rate to a full production rate, the operator may independently control all motor speeds, may selectively choose some slave dependencies, or implement the full master-slave configuration.

At any point in time during this process, various motor dependencies may be engaged by turning respective SYNC values on. For example, after the extruder motor 28, feeder motor 30 and puller motor 38 have been synchronized, that is, strung together with an extruded product, the operator may choose to activate the dependency for feeder motor 30. Consequently, any subsequent changes in commanded velocities of the extruder motor 28 will result in a change of velocity of feeder motor 30, the magnitude of the change will be a function of the magnitude of the change in commanded velocity of extruder motor 28 and the slaving ratio set for feeder motor 30.

The relationship between the magnitudes of the master and slave motor velocities is not absolutely defined by the slaving ratio. For example, in the above scenario, master and slave motor velocities are independently changed until desired operating conditions are achieved. At that point, upon activating the dependencies, subsequent changes in the magnitude of slave motor velocity will occur as a function of the magnitude of change of the master motor velocity and the slaving ratio. In that situation, the defined master-slave dependencies and slaving relationships do not establish a relationship between the magnitudes of the master and slave velocities equal to the ratio. The ratio value is only utilized to provide predictable and known changes to the velocity of the slave motor as a function of changes in commanded velocity of the master motor.

As will be subsequently described, the claimed invention provides an operator selectable feature that will read the current master and slave motor velocities and calculate and store a slaving ratio value as a function of the existing velocities. Consequently, in that situation, the magnitudes of the master and slave velocity are, by definition, related by the slaving ratio. In addition, changes in the commanded velocity of the master motor will result in changes to the velocity of the slave motor according to the magnitude of the slaving ratio.

In either event, with the slave dependencies active, the operator always has the option of entering a velocity command signal for any motor, which in the case of slave motors will override the slave motor velocity established by the dependency relationship to its master.

Referring to FIG. 2, in response to the input values previously described which establish a desired configuration of master-slave relationships, the display controller 134 stores information relating slave motor dependencies to master motors, the state of the SYNC value, the magnitudes of the velocity command signals and the slaving ratios. An example of the stored information is illustrated in the four columns to the left of the Dependencies Table below.

| Status | SYNC ON | VEL | Slave Ratio (%) | Dependencies Table | | | | | |
|---|---|---|---|---|---|---|---|---|---|
| | | | | Index No. | 0 | 1 | 2 | 3 | 4 |
| 6 | 0 | 800 | 0 | Ext A = | 0 | 0 | 1 | 1 | 1 | 1 |
| 1 | 1 | 1200 | 100 | Fdr A = | 1 | 0 | 0 | 0 | 0 | 0 |
| 1 | 1 | 400 | 110 | Ext B = | 2 | 0 | 0 | 0 | 1 | 0 |
| 3 | 1 | 800 | 85 | Fdr B = | 3 | 0 | 0 | 0 | 0 | 0 |
| 1 | 1 | 600 | 110 | Puller = | 4 | 0 | 0 | 0 | 0 | 0 |

Figure 4:
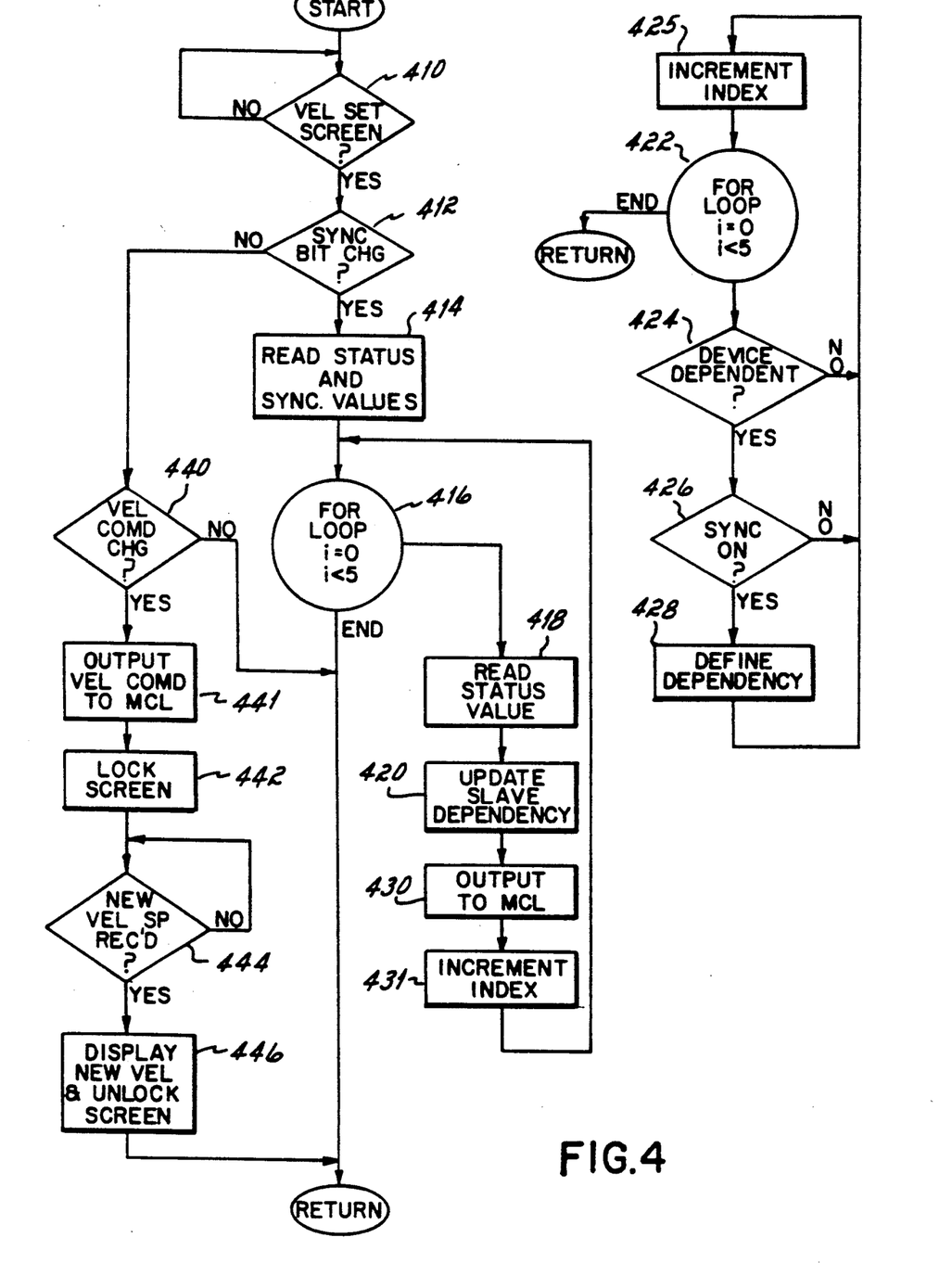
FIG. 4 is a flowchart of a process for identifying the user established master-slave configurations.

FIG. 4 is a flow chart of a process executed by the display controller 134 operating with the microprocessor 112 for creating the above Dependencies Table from the status and SYNC values stored by the display controller. In addition, the process of FIG. 4 provides certain display control functions. In the preferred embodiment, velocity dependencies are initiated by turning on the SYNC switch for a dependent motor. Therefore, any time a change in the SYNC status is detected, the Dependencies Table is recreated. The process at step 410 first determines whether the velocity set screen has been selected, and if so, the process at step 412 determines whether the SYNC value has been changed. If there has been any change in the activation or deactivation of a slave dependency at step 414, the status values and the SYNC switch states are read from the display memory 132. The process then initiates a FOR loop per step 416. In this application, a FOR loop is an iterative loop that is executed a number of times equal to the number of motors available to be configured in master-slave relationships defined by the operator. The number of iterations is tracked by an index number, and each state of the index number is uniquely associated with one of the motors. In the current example of FIG. 3, five motors are available; and therefore, the FOR loop will be executed five times. After being initialized, or set to zero, the index number is incremented one unit with each loop iteration. That process continues until the index is equal to the number of devices at which time the FOR loop is exited.

Within the FOR loop at 416, starting with i=0, which identifies extruder motor 28, the process at step 416 examines the value of the status input for extruder motor 28. Using FIG. 3a as an example, the status for extruder motor 28 has been set to six which is defines a master motor. Next, the process at step 420 will update the dependencies of the extruder motor 28 by executing a second FOR loop at 422. The operation of that FOR loop is identical to the FOR loop 416. It should be noted that the Dependencies Table has a number of rows equal to the number of motors in the configuration, and each row is identified by an index number. In addition, the table has a number of columns and each column is associated with an index number. The purpose of FOR loop 422 is to identify the slave motors actively dependent on the identified master motor, for example, extruder A motor. The FOR loop starts at i=0, extruder A motor, and by examining the status value, the process at step 424 determines that extruder A motor is not dependent on any motor. Therefore, at process step 425, the index is incremented to i=1; and at step 424, the process reads the status value of feeder A motor. The status value of feeder A motor is one, which by definition means that feeder A motor is dependent on extruder A motor.

Next, at step 426, the process reads the status of the SYNC switch for feeder A motor. If the operator has turned the SYNC switch off, the process moves to step 425 where the index is incremented. If the SYNC switch is on, the process moves to step 428 to define the dependency. In this case, according to the status switch, feeder A motor is dependent on extruder A motor, and therefore the process writes a 1 into the i=1 column in the first row of the dependency table. Thereafter, at step 425, the index is incremented and the loop is iterated again, testing the dependency for i=2, extruder B motor. The process will continue to create the dependencies in the first row of the Dependencies Table as a function of the status values and the state of the SYNC switch for each of the motors. When the index is incremented to five, which is equal to the number of motors in a configuration, the process returns to step 430, which will output to the machine control a word comprised of the states of the bits in the first row of the Dependencies Table associated with extruder A. Next, at step 431, the index for the FOR loop at 416 is incremented to i=1, which is the feeder A motor. At step 418, the process reads the status value for the feeder A motor and determines that feeder A motor is dependent on extruder A motor. The process at step 420 checks whether feeder A motor has dependencies. It does not; and at step 430, the second row of zero values of the Dependency Table is output to the operating system. At step 431, the index is incremented to i=2, which is equal to extruder B motor. Even though the status value of extruder B motor does not define it as a master, the process at step 420 will execute the FOR loop at step 422, which again tests each of the status values for a dependency on extruder motor B. The dependency will be found with regard to feeder motor B, and therefore that dependency will be defined in the Dependencies Table as indicated.

Returning to decision step 412, if a change in SYNC status is not detected, the process at decision step 440 determines whether the operator is making a velocity change with respect to one of the motors. If a change in a velocity command signal is detected, the process at step 441 outputs the new velocity command to the operating systems 142. Next, the process at step 442 locks the velocity command inputs for the other motors, thereby limiting the operator to adjusting the velocity command signal one motor at a time. The process at step 444 awaits the receipt by the display controller of a new velocity signal which is determined by the machine control program in response to the operator changing velocity commands at process 446. When the display controller receives the new velocity signal at process 446, it displays the new velocity and unlocks the other motor velocity inputs.

Figure 5A:
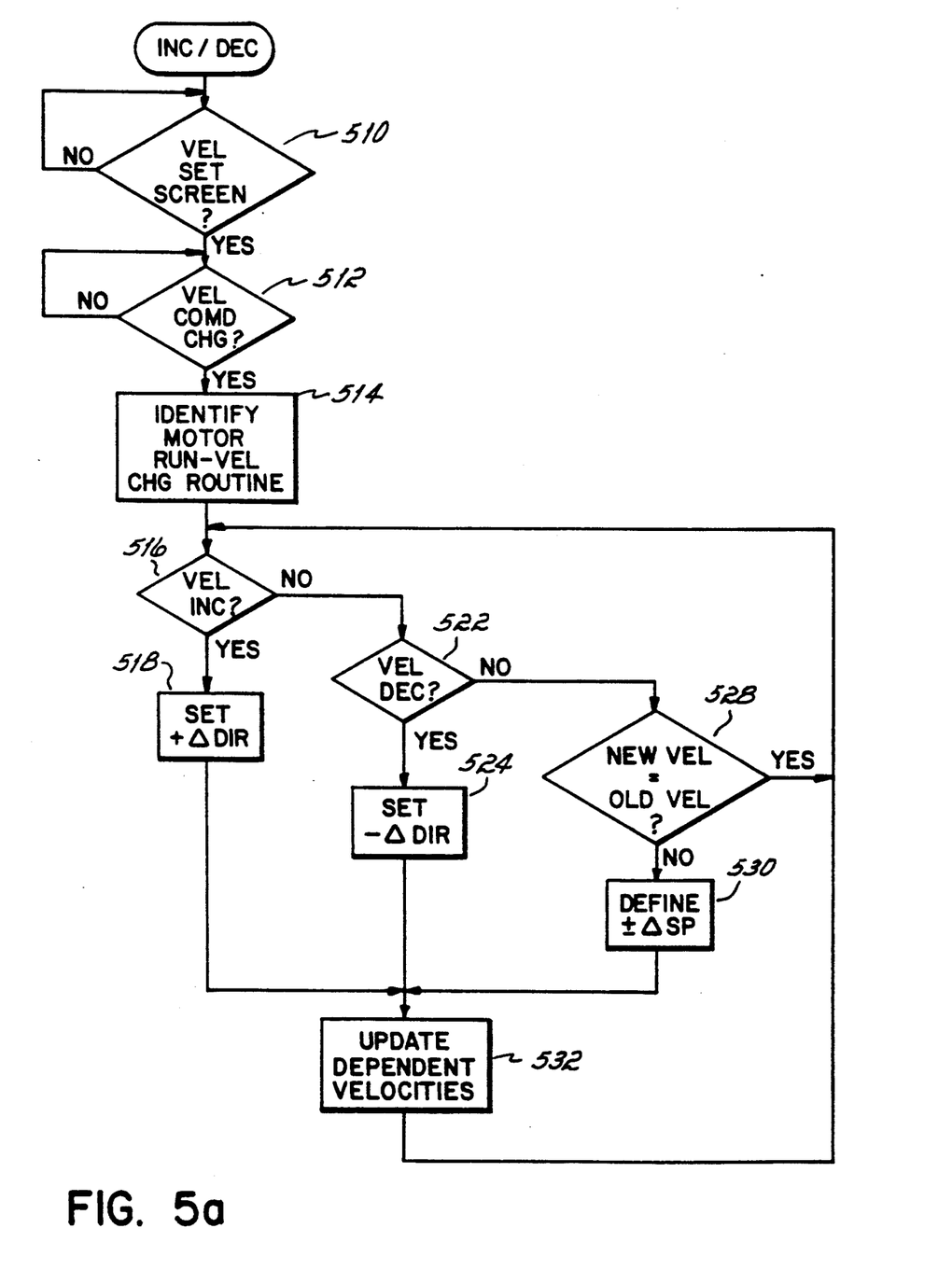
FIGS. 5a, 5b and 5c are flowcharts illustrating the process for determining changes in the new motor velocities based on the user established master-slave configuration.
Figure 5B:
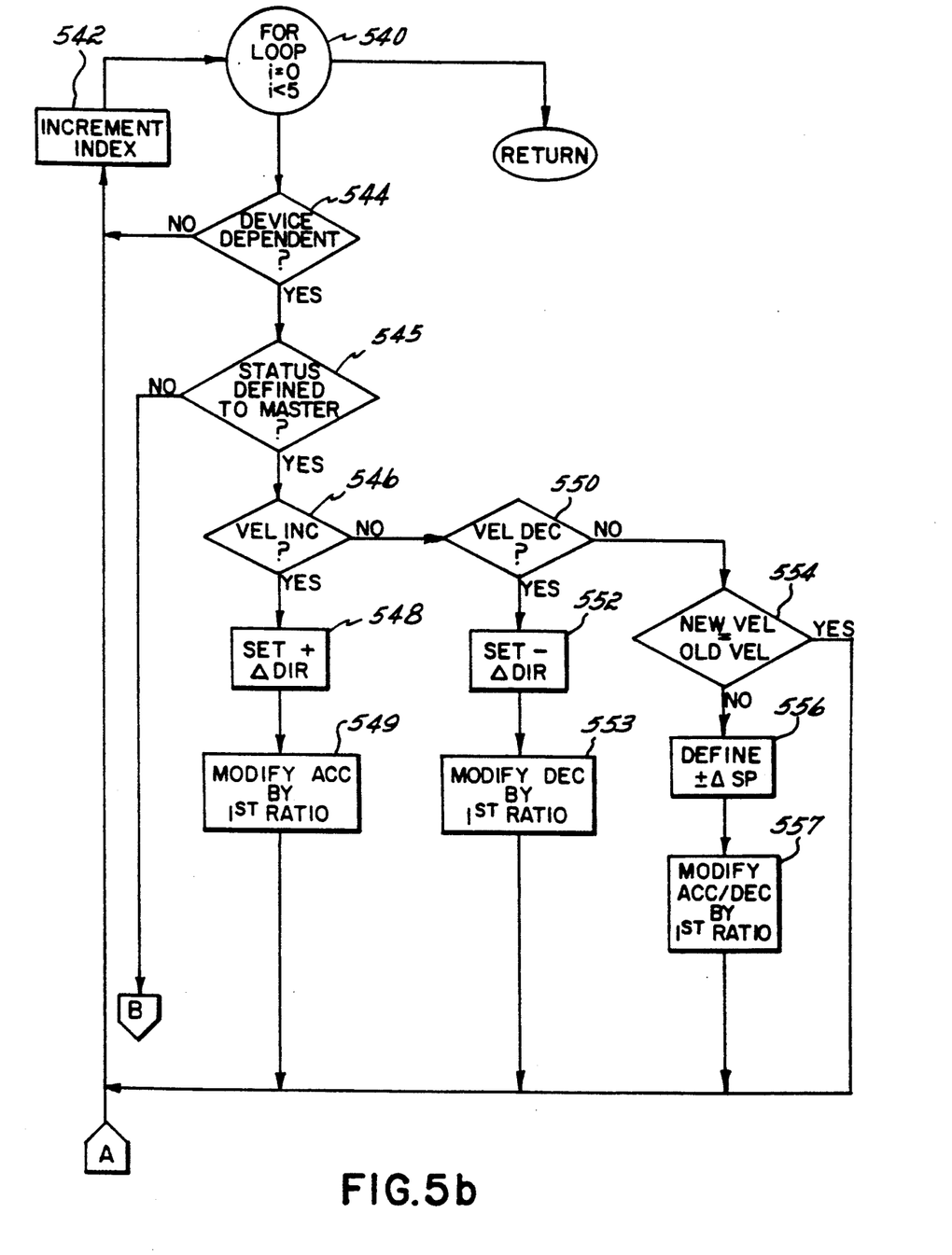
Figure 5C:
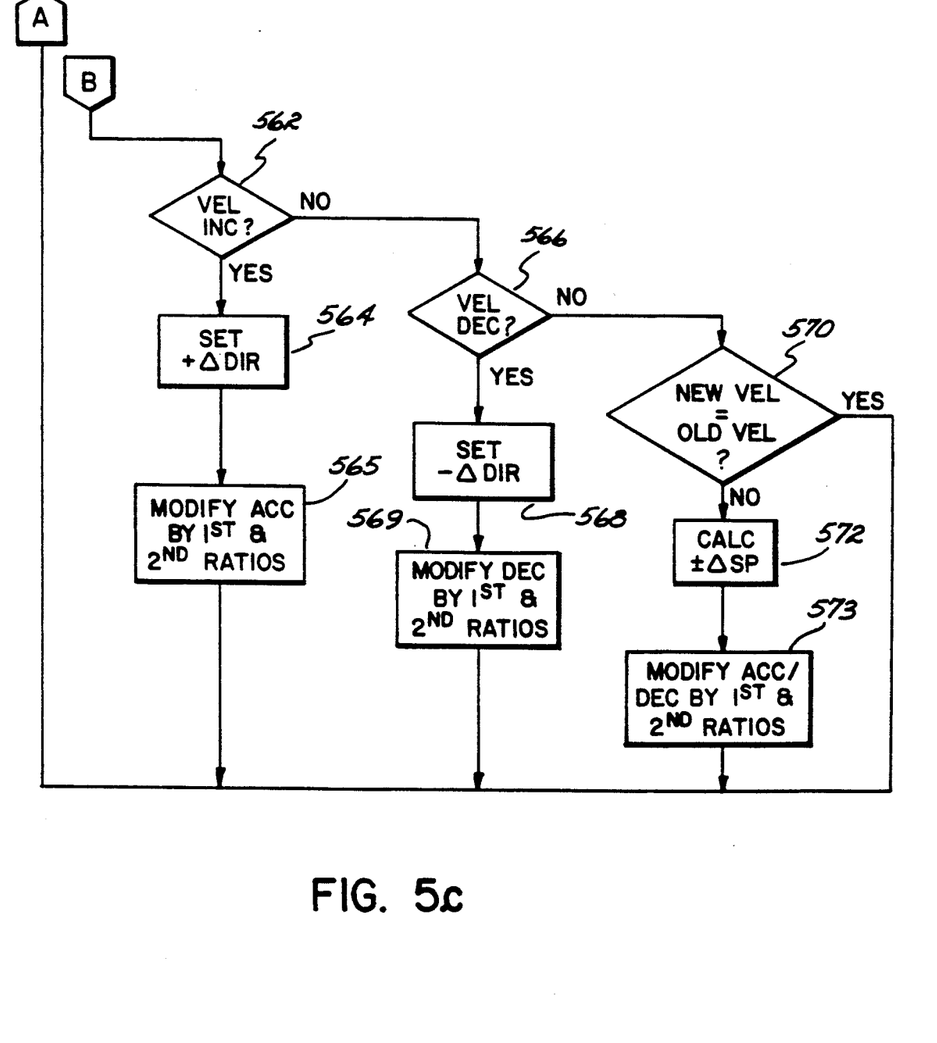

FIGS. 5a, 5b and 5c are flowcharts of a process executed by the operating system 142 in response to changes in the velocity set point and dependencies determined by the process of FIG. 4. At step 441 in FIG. 4 the process outputs new velocity information to the machine control. More specifically, the process will transfer a first register having a value defining a page number equivalent to the current screen being displayed on the operator station 90. In addition, a second register is transferred to the operating system which has a number of bits associated with cursor locations on the current screen at which inputs may be made. Consequently, at step 510, the process can determine whether the velocity set screen has been chosen from the contents of the first register. At step 512, the bits in the second register associated with locations on the screen defining changes in motor velocity are tested, and the process determines whether there has been a change in the commanded velocity. Further, the state of the bits in the second register will identify which motor velocity command is being changed. The process at step 514 examines the second register for that information, and in addition, initiates velocity change routines for the motors that will be subsequently described with regard to FIG. 6.

Next, the process determines whether the change in velocity is increasing or decreasing, or whether the operator has entered a new velocity magnitude. The process at 516 determines whether the change in velocity is caused by an increase key being activated. If so, at step 518, the process sets a bit defining a positive change in direction. If the velocity increase key is not being used, at step 522, the process determines whether the velocity decrease input is being activated. If so, the process sets a bit representing a negative change in velocity direction. If the velocity decrease input is not activated, the process at step 528 compares the current velocity signal being used by the machine control with the new velocity signal received from the display controller. If there is no difference between those signals, the process returns to step 516. If there is a difference between those signals and the velocity increase and decrease inputs are not being used, the new velocity must be the result of the operator using digital entry keys to define the new velocity. The process at step 530 defines the algebraic difference in the change of velocity by subtracting the magnitude of the old velocity from the magnitude of the new velocity. Next, the process determines whether the motor identified by step 514 has any dependencies so that those dependent velocities may be likewise updated.

The process for checking those dependencies is illustrated in FIGS. 5b and 5c, and is illustrated as a FOR loop 540 similar in operation to the iterative FOR loops previously described with regard to FIG. 4. Assume for example, that the process at step 514 has identified extruder A motor as the motor experiencing a change in commanded velocity. The first row of the Dependencies Table must be tested to identify dependencies on extruder A motor. The FOR loop at step 540 will start at i=0. At step 544, the first location in the first row of the Dependencies Table will be tested, and the process will determine that extruder A motor is not dependent on any motor. The index is incremented at step 542 to i=2, the feeder A motor. The second location in the first row of the Dependencies Table is tested at step 544, and the feeder A motor is identified as being dependent on extruder A motor. The process at step 545 then examines the status values which have been previously transferred from the display controller. The test at step 545 determines whether feeder A motor has a status value identifying it as being dependent on the motor identified at step 514, in this case, the extruder A motor. Since the feeder A motor has a status value of one which is defined as a dependency on the extrude A motor, the process continues with the definition of velocity direction changes and slaving ratios.

At step 546 a determination is made whether a velocity increase is being commanded. If so, a directional bit is set to represent a positive change of direction. Acceleration and deceleration constants may be stored in the control by the supplier of the machine. Therefore, at step 548, the stored acceleration constant is scaled by the ratio value associated with feeder A motor, and the resulting rate of velocity change is stored for subsequent use. Similarly, at steps 550, 552 and 553, if a decrease in velocity is being commanded, a negative change of velocity direction bit is set; and the deceleration rate of velocity change is calculated by modifying the stored deceleration constant by the ratio value of the feeder A motor. Further, at steps 550, 556 and 557, if the new velocity received from the display controller is different from the current velocity being output to the feeder A motor, the algebraic difference between those two velocities is determined; and the appropriate rate of velocity change is modifying either the acceleration or deceleration constant by the ratio value associated with feeder A motor. The process then moves to step 542, the index is incremented and the process continues.

When the index is incremented to three, representing the feeder B motor, at step 545, the process will read a status value i=3 for feeder B motor which does not identify a dependency to the master extruder A, the motor identified by process step 514. A status value=3 defines feeder motor B dependent on extruder motor B. Therefore, the process in steps 562, 564 and 567 determines whether the velocity is increasing; and if so, a positive change in direction bit is set and the acceleration constant is modified by the slaving ratio value of feeder motor B times the slaving ratio value of extruder motor B. Similarly, the process in steps 566, 568 and 569 determines whether the velocity is decreasing; and if so, the negative change of direction bit is set, and the deceleration constant is modified by the slaving ratio value of feeder motor B times the slaving ratio value of extruder motor B. Further, in process steps 570, 572 and 573, either the acceleration or the deceleration constant is modified by the slaving ratio value of feeder motor B times the slaving ratio value of extruder motor B.

Figure 6:
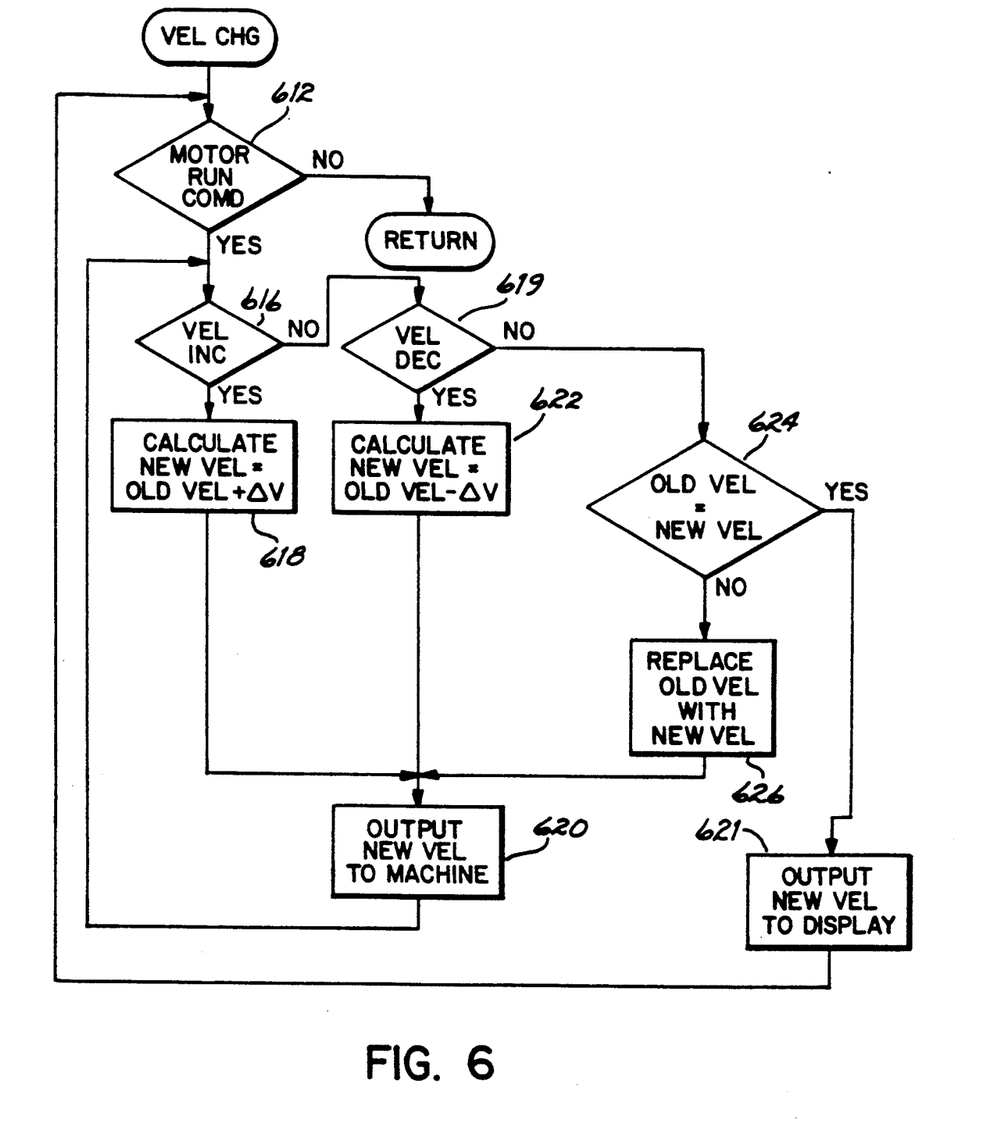
FIG. 6 is a flowchart of a process for producing motor velocity signals.

FIG. 6 is a flowchart illustrating a process for producing output velocity signals for each of the motors. The process illustrated in FIG. 6 is run independently and in parallel for each of the motors. The process is initiated by a command generated by process step 514 of FIG. 5a. Next, at step 612, the process checks the state of the motor run command. The process continues for as long as the motor is running pursuant to operator commands. At step 616, the process determines whether the operator is commanding an increase in velocity. If so, a new output velocity is defined which is equal to the old output velocity plus an incremental change of velocity. The incremental change of velocity is determined by a change of velocity that will occur over a period of time equal to the iteration interval of the process of FIG. 6 times the appropriate rate of velocity change stored in the control.

If the new velocity is not the result of ratio control, for example, changes defined at steps 516, 522 or 528, the change of velocity will be determined using the stored acceleration of deceleration constants. However, if the new velocity is the result of a ratio control such as those velocity changes defined at steps 546, 550, 554, 562, 566, 570, the magnitude of the change of velocity change will be determined using a modified acceleration or deceleration constant as scaled by ratio values in steps 549, 553, 557, 565, 569, 573. By modifying the rates of velocity change with the ratio values, the motors will more precisely exhibit the desired master-slave ratio control.

At step 620, the new velocity signal is output to the machine. The process returns to step 612 and back to step 616. As long as the operator is activating an increase velocity command, the velocity of the selected or a slaved motor will be incrementally increased; and the operator may observe the effect of his change of velocity on machine operation. If there is no increase in velocity commanded, the process at step 621 determines whether a decrease in velocity is commanded. If so, at step 622, a new velocity signal less than the old velocity signal is created and output to the machine and display. Similarly, at step 624, the process checks whether the new velocity is equal to the old velocity. If it is not and no other change of velocity inputs are active, the operator has manually entered a new velocity magnitude; and at step 626, the old velocity value is replaced by the new velocity value. At step 620, a velocity signal having a magnitude equal to the new velocity value is output to the machine.

The operating system 144 produces the new output velocity signal as a digital signal from the controller 110 to the signal processor 104. The signal processor produces a new analog output velocity signal to the respective motor drive and motor. For purposes of this disclosure the motors are electric motors and include respective motor drives. The operation of the motor drive with the motor is effective to maintain the motor velocity at the commanded value produced by the signal processor. If, at step 624, the process determines that the new velocity is equal to the old velocity, the operator is not activating a velocity change input; and therefore the operating system 142 outputs the new velocity set point value to the display controller 134. In step 444 of FIG. 4, the receipt of the new velocity value will result in the process at step 446, displaying the new velocity value and unlocking the other velocity inputs.

As previously described the control has a feature which permits the operator to automatically establish slaving ratio values as a function of the current operating velocities of the motors on the machine. Consequently, the absolute values of the velocities of the master and slave motors will be related by the slaving ratios defined by the process. Thereafter, any changes to the velocities of master motors will be reflected into velocities of slave motors and the absolute values of velocities will continue to be related by the slaving ratios.

Figure 7:
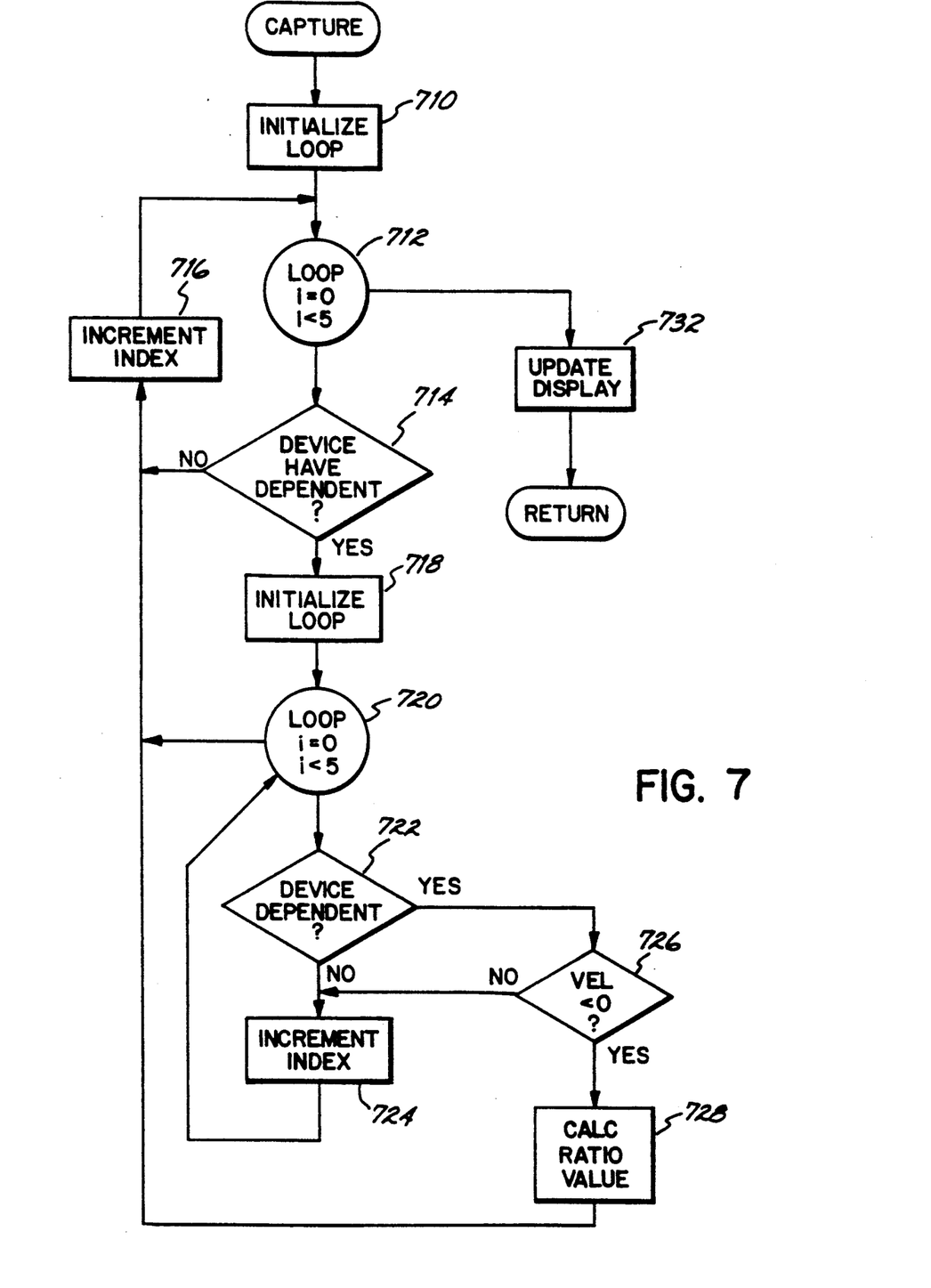
FIG. 7 is a flowchart of a process for automatically determining ratio values.

The process for automatically determining the slaving ratios is illustrated in FIG. 7 and is initiated by an operator executing a capture ratio command. In the process, the first step 710 initializes an iterative loop beginning at step 712. The loop is similar to FOR loops previously described in that it is repeated a number of times equal to the number of motors that may be present in a selectable master-slave configuration. The first iteration for i=0 is a check of the extruder A motor. At step 714, the process determines whether the extruder A motor has dependencies. That check may be made by determining whether the word represented by the bit values in the first row of the Dependencies Table is greater than zero. In the case of i=0, extruder motor A, the value of the word represented the first row of the Dependencies Table is greater than zero; and the process at step 718 initializes a second iterative loop to identify the dependencies that exist with respect to extruder motor A.

The second loop at step 720 starts with the value i=0, and at step 722, the process determines whether the value for i=0, extruder A motor is dependent on the motor identified as having dependencies at step 714. That is determined by looking at the first column location in the first row of the dependency table. Since extruder A is not dependent on extruder A, at step 724, the index is incremented to i=1 and the process iterates to determine whether the feeder A motor position in the first row of the Dependencies Table identifies a dependent. Since the feeder A motor is dependent on the extruder A motor, at step 726, the process determines whether the velocity value for the identified dependent motor is greater than zero. If it is not greater than zero feeder A motor is not running; and it is inappropriate to attempt to define a ratio value. If feeder A motor is running, at step 728, a feeder A motor slave ratio value is calculated by dividing the magnitude of the current velocity of the feeder A motor identified at step 722 by the magnitude of the extruder A motor velocity identified at step 714. That calculated ratio value is then stored; and at step 730 a set screen update flag is set on.

The loop defined by process steps 720, 722 and 724 is iterated a number of times equal to the number of devices until all possible dependencies for extruder A motor are defined. When the loop is completed, the first loop is incremented at step 716 and returning to step 712, the process repeats for the index value i=1, which represents the feeder A motor. At step 714, the word represented by the row of bit values in the Dependencies Table associated with feeder A is checked to determine whether it is greater than zero. Since it is not, the feeder A motor has no dependencies, and the process goes directly to step 716. The index is incremented by one and the process is iterated. The process continues to iterate until all devices in the Dependencies Table have been checked. At that point, at step 732, the ratio values calculated at step 728 are transferred from the operating system back to the display controller, and the display screen is updated with the newly calculated ratio values.

Even though the invention is illustrated as applied to an extruding system in which a plurality of motors are mounted on a common base, the invention is applicable to any grouping of motors in which it is desirable to establish a configuration of master-slave relationships. Further, it is common for the configuration of master-slave relationships to include motors that have substantially different speed ranges. A motor with a large speed range will experience changes in speed which will represent only a small portion of the total speed range of that motor; however those speed changes may represent a significant portion of the speed range of a dependent slave motor having a smaller speed range. Consequently, to provide a more predictable result, instead of using the absolute value of the change in motor speed to control dependencies, the preferred embodiment determines the percentage or proportion of commanded velocity change to the full speed range. A new slave velocity signal for a slave motor is determined by changing the old slave velocity signal by an amount equal to the product of the slaving ratio value times the percentage or proportion of change in the commanded velocity of the master to its speed range.

That process may be implemented in several ways. First, it may be implemented mathematically by detecting the change in the velocity command signal of the master, determining the percent of the master speed range represented by that change, multiplying that percentage by the slaving ratio and increasing or decreasing, as required, the slave velocity signal by the resulting percentage or proportionality factor. Alternatively, within the control to achieve that proportioning function, the speed range of all the motors are scaled to a common digital range; for example, 30,000 bits. Therefore, within the control all motors appear to have a common speed range. The scaling factor used to convert the speed range of each motor to the common digital scale must be applied to changes in velocity command signal inputs and to the output velocity signals for each motor.

While the invention has been illustrated in some detail according to the preferred embodiments shown in the accompanying drawings and while the preferred embodiments have been described in some detail, there is no intention to thus limit the invention to such detail. On the contrary it is intended to cover all modification, alterations and equivalents falling within the spirit and scope of the appended claims.

What is claimed is:

1. A reconfigurable master-slave control method for controlling velocities of a plurality of motors wherein a velocity of at least one motor is determined as a function of a velocity of another motor, the method comprising the steps of:
   producing dependency signals defining master-slave configurations designating first selectable motors as master motors and second selectable motors as slave motors;
   producing master velocity signals representing desired velocities of the master motors;
   producing ratio signals relating velocities of slave motors to velocities of the master motors;
   producing slave velocity signals in response to the dependency signals, the ratio signals and the master velocity signals, the slave velocity signals representing desired velocities of the slave motors and determined as a function of the ratio signals and the desired velocities of the master motors; and controlling the velocities of the plurality of motors in response to the master velocity signals and the slave velocity signals.

2. A reconfigurable master-slave control method for controlling velocities of a plurality of motors wherein a velocity of at least one motor is determined as a function of a velocity of another motor, the method comprising the steps of:

producing dependency signals defining master-slave configurations designating first selectable motors as master motors and second selectable motors as slave motors;

producing master velocity signals representing desired velocities of the master motors;

producing ratio signals representing ratio values relating changes of velocity of master motors to changes of velocity of slave motors;

detecting changes of the master velocity signals;

producing slave velocity signals in response to the changes of the master velocity signals, the ratio signals and the dependency signals, the slave velocity signals representing desired changes of velocities of slave motors; and controlling the velocities of the plurality of motors in response to the slave velocity signals and the master velocity signals.

3. The method of claim 2 wherein one of the master-slave configurations designates a plurality of motors as slave motors having velocities determined as a function of a velocity of a single master motor, and the step of producing ratio signals further produces a unique ratio signal for each of the plurality of slave motors, whereby the step of producing slave velocity signals further produces a slave velocity signal for each of the plurality of slave motors in response to the dependency signals, a change of the master velocity signal of the single master motor and the unique ratio signals.

4. The method of claim 2 wherein one of the master-slave configurations designates a first slave motor having a velocity determined as a function of a velocity of a second slave motor and the second slave motor having a velocity determined as a function of a velocity of a master motor, and wherein the step of producing ratio signals further produces first and second ratio signals associated with the first and second slave motors, respectively, and said step of producing slave velocity signals further produces a first slave velocity signal as a function of a change of velocity of the first master motor and the first and second ratio signals and a second slave velocity signal as a function of a change of velocity of the second slave motor and the first ratio signal.

5. The method of claim 2 further comprising the step of producing a sync signal for each slave motor, and wherein the step of producing slave velocity signals further comprises the steps of:

producing in response to detecting a first state of the sync signal, a slave velocity signal independent of a velocity of any other motor; and producing in response to detecting a second state of the sync signal, a slave velocity signal as a function of the velocity of another motor.

6. The method of claim 2 wherein the step of producing slave velocity signals produces slave velocity signals representing changes in velocities of the slave motors as a function of the changes of velocities of the master motors times the ratio values.

7. A reconfigurable master-slave control method for controlling velocities of a plurality of motors wherein a velocity of at least one motor is determined as a function of a velocity of another motor, the method comprising the steps of:

producing dependency signals defining master-slave configurations designating first selectable motors as slave motors and second selectable motors as associated master motors;

producing master velocity signals representing desired velocities of the master motors;

producing slave velocity signals representing desired velocities of slave motors;

producing ratio signals for each of the slave motors in response to the master velocity signals and the slave velocity signals, the ratio signals representing the values of a ratio of velocities of slave motors to the velocities of associated master motors;

detecting changes of master velocity signals;

modifying the slave velocity signals in response to the detected changes of the master velocity signals, the dependency signals and the ratio signals; and controlling the velocities of the plurality of motors in response to the master velocity signals and modified slave velocity signals.

8. A reconfigurable master-slave control apparatus for controlling velocities of a plurality of motors wherein a velocity of at least one motor is determined as a function of the velocity of another motor, the apparatus comprising:

means for selectively designating first selected motors as master motors and second selected motors as slave motors in master-slave configurations to produce dependency signals representing the master slave configurations, defining master velocity signals representing desired velocities of master motors;

defining ratio signals representing ratio values relating desired velocities of masters and slaves;

means for producing slave velocity signals in response to the dependency signals, the master velocity signals and the ratio signals, the slave velocity signals representing desired velocities of slave motors; and means for controlling the velocities of the plurality of motors in response to the master velocity signals and the slave velocity signals.

9. The apparatus of claim 8 wherein the apparatus further comprises means for detecting changes in the master velocity signals.

10. The apparatus of claim 9 wherein the apparatus further comprises:

means for selectively designating a master motor and first and second slave motors wherein the first slave motor has a velocity changing as a function of a velocity of the second slave motor and the second slave motor has a velocity changing as a function of a velocity of the master motor, defining a master velocity signal representing a desired velocity of the first master motor, and defining first and second ratio signals representing first and second ratio values associated with the first and second slave motors, respectively;

means for producing a first slave velocity signal in response to a detected change of velocity of the second slave motor and the first ratio value and a second slave velocity signal as a function of a change of velocity of the master motor and the first and second ratio values.

11. The apparatus of claim 9 wherein the apparatus further comprises means for producing sync signals for each slave motor, and the means for producing slave velocity signals includes means responsive to a first state of the sync signal for producing a slave velocity signal independent of a velocity of a designated master motor, and means responsive to a second state of the sync signal for producing a slave velocity signal as function of the velocity of the designated master motor.

12. The apparatus of claim 9 wherein the means for producing slave velocity signals produces slave velocity signals representing changes in the velocities of the slave motors as a function of the changes of velocities of the master motors times the ratio values.

* * * * *